July 16, 1963   E. S. WIESZECK   3,097,973
PROTECTIVELY CONTAINED SENSING APPARATUS
Filed May 23, 1960   2 Sheets-Sheet 1

INVENTOR
EMIL S. WIESZECK

BY

ATTORNEY

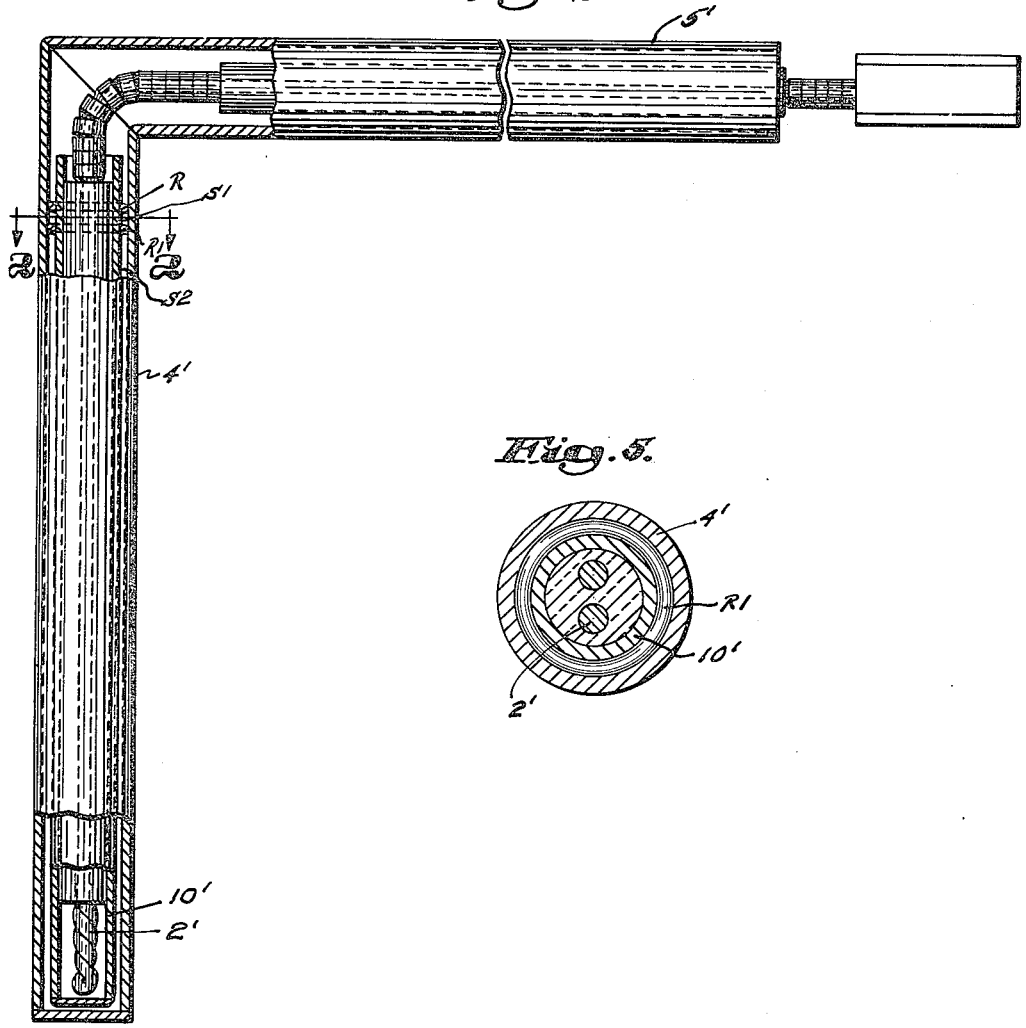

3,097,973
PROTECTIVELY CONTAINED SENSING APPARATUS
Emil S. Wieszeck, Box 175, Salem, N.H.
Filed May 23, 1960, Ser. No. 30,793
7 Claims. (Cl. 136—4)

This invention relates to thermocouples and in particular to an immersion type thermocouple of the class employed for determining relatively high temperatures which may occur in molten salt baths as used in heat treatment of metals. This application is a continuation-in-part of my corresponding application, Serial No. 560,416, filed January 20, 1956, now abandoned.

A common practice in determining relatively high temperatures in molten salt baths, for example in a temperature range of 1,400° F.–1,800° F., is to immerse a thermocouple protectively contained in a right angularly shaped metal conduit which is closed at its lower end.

The thermocouple elements are usually bent and received through this right angularly shaped tubular assembly. The part of the conduit extending vertically into the hot salt bath is frequently referred to as the "hot leg," and the portion extending horizontally from the hot leg is called the "cold leg."

A long standing difficulty with such instruments is their tendency to rapid deterioration. The molten salts attack the protective metal tube. Gases thus formed in a nascent state are held about the surface of the immersed hot leg and eventually permeate the metal constituting the tubular wall and thereafter rapidly destroy the thermocouple member. The ability of such gases, as well as the chemical reagent itself to permeate the metal may be heightened by microscopic imperfections in the metal composition, particularly where the crystalline structure of the metal may seek to rearrange itself upon being subjected to high temperatures with resulting induced expansion effects.

A metal found to be partly resistant to corrosion is "Inconel," or a similar nickel-chrome-iron alloy, but even this type of substance is vulnerable and frequent replacement of the costly Inconel and thermocouple member is necessary. In practice, it is desirable to replace the costly Inconel by relatively cheaper iron at the cold leg of the assembly. This requires an elbow coupling and threaded joints which are also found to be permeable by corrosive gases. Thus a better union at the point of junction of the two legs is desirable.

A further difficulty may develop from expansion and contraction effects developing from temperature fluctuation in different parts of the protective conduit structure. This may occur in connection with the hot leg of a thermocouple which is never removed from the hot bath during its working life, or it may occur with a hot leg which is removed daily from its molten bath. It is, in general, an object of the invention to deal with problems arising out of corrosion and dimensional change of protective conduits for immersion type thermocouples and especially to provide an improved thermocouple construction which is characterized by economy, long working life, and a satisfactory union or joint at the points of junction of the hot and cold leg conduits.

In this connection I have discovered that I may successfully protect a thermocouple against corrosion by locating a sealed volume of gas or other fluid between a thermocouple member and an outer conduit surface which is in contact with a salt bath whose temperature is to be measured.

I may also induce and provide formation of protective films along the inner surfaces of the hot leg by means of a sealed volume of gas which contains a film forming agent.

I find that by exposing this sealed volume of gas, e.g. air, to a sudden rise in temperature such as occurs when immersing the hot leg in a salt bath at temperatures of from 1,100° F.–2,200° F., and by maintaining the seal at all times, I am enabled to induce an appreciable increase in pressure, well above atmospheric pressure, and ranging from 2–3 pounds' gauge pressure, all the way up to 25–50 pounds' gauge pressure. The sealed volume of gas in the indicated pressure range constitutes a barrier which effectually excludes penetration of the thermocouple conduit by salt bath gases even though the thermocouple is exposed for long periods of time continuously and is immersed at varying depths of salt baths. I also found that by holding a hot oxidant containing gas such as air in contact with the metal of the hot leg, an oxidation film is formed which is caused to harden and adhere to the inner surface of the hot leg. When this film is present and pressure is maintained, the working life of the hot leg is extended from four to five times and longer.

As one means of satisfactorily confining a sealed volume of gas, I employ a second tubular conduit concentrically arranged inside of the hot leg conduit above described to thus provide a dual conduit structure in which is defined an annular chamber. The lower end of the inner tube in the hot leg is closed. I have further devised a unique connection to effectively seal the annular space at the upper end of the inner tubular member and at the same time to provide a solid bridging or sealing wall which constitutes a union at the point of junction of the hot leg and the cold leg.

This sealing wall, or bridging, is of a generally elliptical shape to conform to the opening at the upper end of the hot leg. I find that in this elliptical sealing wall a desirable rigidity is imparted to the dual tube structure so that not withstanding the occurrence of differential forces of expansion and contraction resulting from temperature changes, I may satisfactorily maintain the inner and outer tubular sections fixed to one another so as to hold the sealed volume of gas between the two conduits even when raised to relatively high temperatures in the 1,100°–2,200° F. range. Moreover, the union between the hot leg and the cold leg is made very strong by the sealing wall, and when reinforced with welding, is completely resistant to gases from the molten bath.

This arrangement of two tubular members solidly connected by means of an elliptical rigid sealing wall is especially suitable for use in holding the sealed volume of gas in a type of operation where the salt bath is electrically heated and the thermocouple is not removed from salt bath for long periods of time.

I have also devised another form of the invention in which a sealed volume of gas may be satisfactorily held between two tubular bodies in such a manner that a slight displacement of the outer hot leg may take place relative to the inner tube. This type of thermocouple is designed for use where removal of the thermocouple from the salt bath is to occur daily. In this latter arrangement there is combined with the inner tubular conduit and the outer hot leg conduit special sealing ring means uniquely associated with the tubular members to hold a sealed volume of gas.

I have still further learned that I may, in some cases, modify the technique of the invention by holding the fluid barrier between a sensing element and a protective conduit in communication with a controlled head of pressure so that varying predetermined pressure values may be exerted. This may be done, for example, by connecting the thermocouple assembly to a source of compressed air. Controlled application of pressure in this way is especially effective in dealing with fluids such as molten salts of considerable volume and depth where pressure increases hydrostatically.

There may still further be employed, in accordance with the invention, a fluid barrier which includes chemical components or reagents capable of neutralizing, oxidizing, reducing or otherwise reacting with those chemical materials which seek to pass through and penetrate the tubular enclosure. I find that a very desirable control of chemical deterioration may be achieved in this manner.

Moreover, by arranging two protective concentric enclosures in such a way that an air gap of predetermined magnitude exists between the end of the inner enclosure and the end of the outer enclosure, there may be realized a significant selectivity in the normal sensitivity characteristics of the thermocouple. This deviation, being observable on suitable instruments and subject to variation with deterioration of the outer enclosure member when chemically attacked, may be relied upon to serve as a warning indication of near breakdown or dangerous wear in the outer enclosure body. Thus, when a change in deviation of sensitivity is detected, such a change becomes an indication that the outer enclosure of the hot leg should be replaced. It will be appreciated that this can, as a practical matter, be done before the remaining components of the assembly are injured, thus effecting desirable savings and avoiding loss of operating time.

The nature of the invention and its further objects and novel features will be more fully understood from the following description of preferred embodiments of the invention selected for purposes of illustration and shown in the accompanying drawings, in which:

FIGS. 4 and 5 illustrate a modified form of a thermocouple device particularly designed for use in a gas-fired salt bath.

Figure 1:
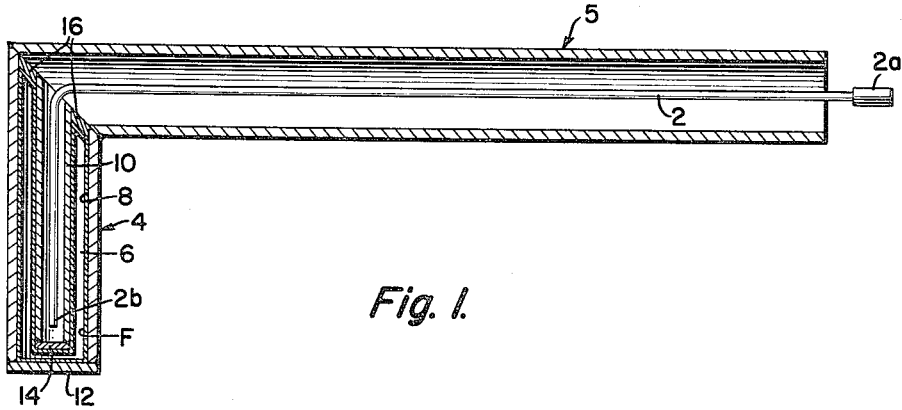
FIG. 1 is a view in cross section taken along the longitudinal central axis of one form of immersion type thermocouple assembly particularly designed for use in a continuous operation where an electrically heated salt bath is used.

Considering in detail the construction shown in FIG. 1, numeral 2 denotes a sensing device consisting of a thermocouple member of the type commonly employed in determining temperatures in a fluid body such as, for example, a molten salt bath commonly used in the heat treatment of metals. The thermocouple is made by joining together the ends of two dissimilar metals, utilizing a solder or brazing material whose melting point will not be exceeded by the temperatures to which the thermocouple is subjected.

The thermocouple is provided at its cold end with a lead 2a, and it will be understood that a sensitive multimeter indicator or electronic amplifier unit may be connected to the lead 2a, and then becomes responsive to differences between the hot tip 2b of the thermocouple, and the cold end 2a.

In accordance with the invention, I combine with the thermocouple a sealed volume of gas such as air, carbon dioxide, or other fluid. In one preferred form of means for containing the volume of gas, I provide a right angularly shaped conduit which includes a hot leg section of "Inconel" generally denoted by the arrow 4, and a cold leg section of iron generally denoted by the arrow 5. The two sections are preferably cut so that the extremities may meet and be joined together at an angle of 45° as shown. These ends are fastened externally by means of welding and are reinforced internally by means of an elliptically shaped sealing wall 16, having an opening formed therethrough.

Supported on the wall 16 within the hot leg 4, I further provide an inner tubular body 10 which is closed at its lower end by a plug 14. At its upper end member 10 is cut to form an angled face coinciding with the angle of cutting of the outer legs 4 and 5, and this face is welded around the opening in the elliptical sealing wall 16 as shown to form a closed chamber 6. The closed chamber 6 thus comprises a sealed space in which I may confine a volume of gas which, when exposed to high temperatures, will be at greatly increased pressure inside of tubular member 8.

The elliptically shaped bridging or ring body 16, I find to be an important feature of the invention both in securing the two legs and in maintaining a sealed volume of air in a range of pressures which can successfully resist salt bath gas penetration. The angular disposition of the elliptical sealing wall 16 resists deformation when either the hot leg or cold leg tends to expand or contract. Moreover, the wall 16 in effect suspends the tube 10 so that it is independent of changes in length and diameter of the outer tube 4. As an example of a range of gas pressures which I have found will successfully accomplish the function referred to of resisting gas penetration, there may be cited a range of pressures running from a value in excess of atmospheric pressure, ranging up to values of from 25–50 pounds per square inch. In one typical operation a pressure of 45–48 pounds per square inch was noted in a hot leg of Inconel immersed to a depth of 12" in a molten bath at 1,500° F. There was also induced on the inner surface of the Inconel hot leg a thin impenetrable film F of oxidized material resulting from reaction of the oxygen in the air with the metal surfaces. During periods of exposure and contraction of the hot leg the film F was constantly ruptured and reinforced by the oxygen held under high pressure against the surfaces.

In one specific operation the hot leg may be immersed in a molten salt bath of the electrically heated type, for example, and the cold leg extends horizontally away from the top of the container which holds the molten salt body. When the hot leg is first immersed, the relatively high temperature of the salt bath, for example, 1,100° F.– 2,200° F., rapidly heats this member. The intensity of heat has a tendency to increase slightly the dimensions of the hot leg 4. However, the elliptically shaped sealing wall, or ring 16, by reason of its heavy rigid construction, is designed to resist heat stresses and changes in dimension of any nature which would separate the sealed edge of the tube 10, and by this means a permanent sealed condition can be maintained to hold the desired range of gas pressures at high temperature for long periods of time.

As the volume of sealed air is heated, it will be apparent that it increases in pressure within the predetermined range of pressures above indicated. This range of pressure has been found to constitute a substantial barrier which opposes and effectively excludes penetration of gas or chemical material from the molten salt through the walls of the tubular member 6 for long periods of time.

In making temperature determinations with the protectively contained thermocouple assembly of the invention, I may arrange the inner tubular part 10 in a position such that its closure plug 14 is in spaced relation to the closure plug 12 of the tubular part 8, and this spacing may be varied considerably. It is pointed out that by permitting an air gap to thus exist between ends of the two parts 8 and 10, there may be realized a significant deviation in the sensitivity characteristics of the thermocouple assembly which can be very advantageously utilized. Thus, it will be obvious that with such an air gap, and at all times while the outer tubular part 8 remains intact, the thermocouple sensitivity will be slightly less than it would be without the air gap, or if the outer tubular part 8 becomes worn through. This effect is best illustrated when an on-off type pyrometer controller recorder is used. The control cycle, when the thermocouple of FIG. 1 is new, might be, for example, twelve actuations of the control valve or solenoid per 15-minute interval. When the outer tube becomes worn through, the control cycle may increase to as much as eighteen controller actuations per 15-minute interval. This affords a definite indication of thermocouple assembly condition. Therefore, when the recorded data indicates a change in sensitivity representative of air, the thermocouple should be removed from use and refitted with a new outer tubular section 8. This prevents total loss of the entire assembly, such as happens when the hot leg becomes worn through in a conventional thermocouple assembly. Hence, a very important economy may be realized from the particular tubular arrangement described.

Figure 2:
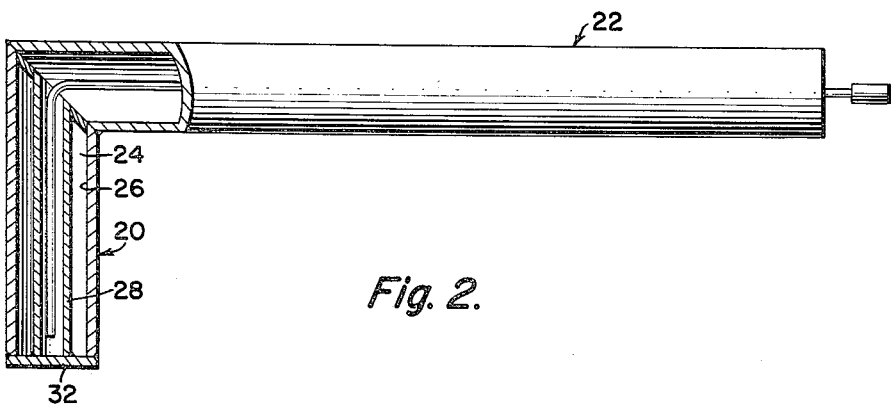
FIG. 2 is a view in elevation and partial cross-section of a thermocouple assembly similar to the assembly shown in FIG. 1, but differing in the spacing of one of the tubular enclosures.
Figure 3:
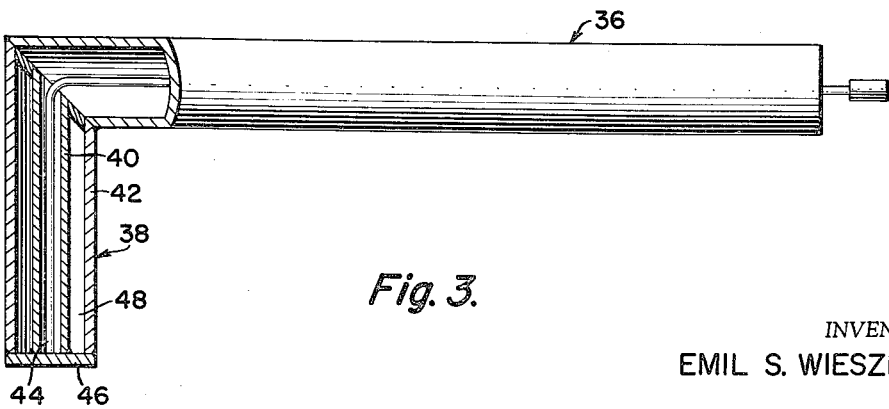
FIG. 3 is another view in side elevation and cross section of still another form of thermocouple assembly.

It should be understood that the invention is not intended to be limited to the particular form and characteristics described in connection with the embodiment of FIG. 1. I may desire to have a thermocouple assembly, such as shown in FIG. 2, wherein a hot leg denoted by numeral 20 is joined to a cold leg indicated by the numeral 22 along angularly cut faces, as described with respect to the arrangement of FIG. 1 and including a sealed chamber 24 defined by an outer tubular part 26 and an inner tubular part 28 in which may be contained a barrier fluid 30. In this particular instance, the inner tubular section 28 may extend down into sealed relationship with a plug 32 which is joined to the outer tubular section 26. In this arrangement, little deviation from the standard sensitivity characteristics of a conventional type thermocouple is present. However, the fluid barrier still operates to oppose penetration of gas through the walls of tubular member 26. In this arrangement the elliptical sealing wall is especially effective in resisting dimensional changes tending to displace the plug 32.

In providing a volume of gas in a predetermined pressure range for a thermocouple of the type designated for use with an electrically heated bath, I may employ various gases which include chemical components or constituents in place of the air noted in FIG. 1. Similarly, it may be desired to pump fluid materials of predetermined chemical composition into the fluid barrier chamber in accordance with pressure conditions of varying nature to which the hot end of the thermocouple may be subjected, particularly in dealing with relatively large volumes of hot fluids whose temperature is to be determined. It may also be desired to combine a fluid barrier with a protectively contained thermocouple utilizing other forms of closed chambers than that comprised by the concentric tubular arrangement described as, for example, by a cellular type of structure, or a spirally-shaped chamber. Further, although the invention and its various modifications has been described, having in mind chiefly the protection of a thermocouple and the carrying out of temperature observations, it may be desired to deal with other types of sensing devices, such as bolometers and other detectors, where the problem of protection may be necessary.

In the modification shown in FIGS. 4 and 5, I have illustrated an arrangement especially devised to deal with a gas-fired salt bath where the thermocouple employed is usually removed from the bath at frequent intervals. In practice, most gas-fired salt baths, as distinguished from electrically heated baths, do not run continuously, and are generally shut off at the end of a day's work. A common practice is to remove the thermocouple assembly from the salt bath at the end of each day and allow the thermocouple assembly to air cool. Air cooling can be quite rapid causing the outer tube, or hot leg, to contract appreciably, while the inner tube of the invention above described, is still hot and expanded. The result may be that the end of the inner tube may change differentially and distort or stress the conduit outer hot leg, and in this way damaging the thermocouple assembly.

To deal with this situation, I have devised the special form of thermocouple of FIGS. 4 and 5 in which the welding at the angularly cut end of the hot leg assembly, as well as the sealing wall 16, is eliminated and replaced by another type of sealing means for maintaining a sealed volume of gas. This avoids undesirable stressing as a result of exposure to frequent heating and cooling cycles. In place of the sealing wall 16, therefore, I may provide one or more pressure type rings located in spaced relation between an inner conduit, and the outer hot leg to provide a sealed annular space. As shown in FIG. 4, for example, a hot leg 4' is joined to a cold leg 5', and a thermocouple 2' is mounted through these members. Within the hot leg 4' is provided an inner conduit 10' which surrounds the thermocouple 2' as shown, and which may contain a layer of asbestos or other fibrous packing material.

In accordance with the invention, I secure the inner conduit 10' within the hot leg 4' by means of sealing rings R and R1, which are spaced apart to define an upper annular space S1, and a lower annular space S2. These rings may be of a diameter such that they may be solidly pressed into place to provide a seal and yet the inner tube may move slightly in the ring when the hot leg expands and contracts. In some cases, the lower ring R1 may be used as a pressure type bearing and in other cases it need not be pressure-tight. If it is to be used as a bearing only, as may be desirable in some cases, it may be vented.

The rings R and R1 may be of a heat resisting material as, for example, an alloy having properties similar to the materials used in the hot leg. I may also desire to use a ring consisting of an alloy designed to melt at a given temperature to release annular pressure at certain temperatures and act as a pressure release means.

It will be seen that by means of a ring as described, a sealed volume of gas may be held between the inner conduit 10', and the hot leg 4'. It is also possible by a two ring arrangement to have two pressure regions of different values. This is desirable since more than three-quarters of the hot leg is generally immersed in the salt. That portion of the hot leg immersed in salt can be made to include a desired fluid and pressure condition, while that portion occurring above the salt bath, may be provided with another type fluid, and another pressure. By controlling the type and arrangement of rings, it will be seen that desirable controls are present and a safety feature is built into the thermostat since one of the rings may be chosen to release pressure at some desired temperature and prevent bursting of the hot leg with consequent spattering of the hot salt bath.

For the gas-fired type salt bath operation described, the ring sealing arrangement functions to satisfactorily contain a volume of gas at the high pressures above noted which are effective to prevent gas penetration and corrosion, and yet the inner conduit may move slightly in the rings to compensate for contraction and expansion of the hot leg without undesirably stressing the thermocouple structure so as to cause breakdown, or failure.

Various other changes and modifications may be resorted to in keeping with the scope of the invention as defined by the appended claims.

I claim:

1. A temperature-measuring device for a salt bath, and the like, comprising:
   (A) an outer tubular element having generally an L shape and defined by
       (1) a hot leg portion adapted to be generally vertically disposed, and
       (2) a cold leg portion adapted to be generally horizontally disposed, thereby defining substantially a right angle, with said leg portions being united by a generally elliptically-shaped weld,
   (B) an inner tubular element concentrically disposed within said hot leg portion to provide an annular space therebetween,
   (C) means closing the lower end of said hot leg portion and the lower end of said inner tubular element,
   (D) a centrally apertured elliptical-shaped plate extending between the upper end of said inner tubular element and the weld junction between said hot and cold leg portions and weldably secured therebetween, said plate, with said closing means, defining a sealed chamber between said inner tubular element and said hot leg portion,
(E) a pressure fluid in said chamber, and
(F) generally L-shaped thermocouple means in said inner tubular element extending past said junction and within said cold leg, said thermocouple means being equipped with cold end connection means adjacent the end of said cold leg portion opposite the end thereof welded to said hot leg portion.

2. The device of claim 1 in which said hot leg portion is constructed of Inconel.

3. A temperature-measuring device for a salt bath, and the like, comprising:
(A) an outer tubular element having generally an L shape and defined by
 (1) a hot leg portion adapted to be generally vertically disposed, and
 (2) a cold leg portion adapted to be generally horizontally disposed, thereby defining substantially a right angle, with said leg portions being united by a generally elliptically-shaped weld,
(B) an inner tubular element concentrically disposed within said hot leg portion to provide an annular space therebetween,
(C) means closing the lower end of said hot leg portion and the lower end of said inner tubular element,
 (1) said closing means including separate closures for each of said inner tubular element and said hot leg portion,
 (2) said closures being spaced apart to permit differential elongation and contraction of said inner tubular element and said hot leg portion,
(D) a centrally apertured elliptical-shaped plate extending between the upper end of said inner tubular element and the weld junction between said hot and cold leg portions and weldably secured therebetween, said plate, with said closing means, defining a sealed chamber between said inner tubular element and said hot leg portion,
(E) a pressure fluid in said chamber, and
(F) generally L-shaped thermocouple means in said inner tubular element extending past said junction and within said cold leg, said thermocouple means being equipped with cold end connection means adjacent the end of said cold leg portion opposite the end thereof welded to said hot leg portion.

4. A temperature-measuring device for a salt bath, and the like, comprising:
(A) an outer tubular element having generally an L shape and defined by
 (1) a hot leg portion adapted to be generally vertically disposed, and
 (2) a cold leg portion adapted to be generally horizontally disposed, thereby defining substantially a right angle, with said leg portions being united by a generally elliptically-shaped weld,
(B) an inner tubular element concentrically disposed within said hot leg portion to provide an annular space therebetween,
(C) means closing the lower end of said hot leg portion and the lower end of said inner tubular element,
(D) a centrally apertured elliptical-shaped plate extending between the upper end of said inner tubular element and the weld junction between said hot and cold leg portions and weldably secured therebetween, said plate, with said closing means, defining a sealed chamber between said inner tubular element and said hot leg portion,
(E) a pressure fluid in said chamber,
 (1) said fluid including a gas having a pressure of above about 2 pounds per squre inch gauge,
 (2) said gas containing an oxidizing portion adapted to form a film on the inner surface of said leg portion, and
(F) generally L-shaped thermocouple means in said inner tubular element extending past said junction and within said cold leg, said thermocouple means being equipped with cold end connection means adjacent the end of said cold leg portion opposite the end thereof welded to said hot leg portion.

5. In improved sensing apparatus for measuring temperatures of fluids, said apparatus comprising:
(A) a thermocouple,
(B) an inner tubular element having an imperforate wall and located in spaced relation around the thermocouple,
(C) an outer tubular member concentric with the inner tubular element and supported in spaced relationship around the said inner tubular element to define a closed annular chamber which is completely isolated with respect to the thermocouple, said outer tubular member comprising a hot leg and further including a tubular extension joined to said hot leg at substantially a right angle thereto, an elliptical sealing wall extending between the inner tubular element and the junction of said hot leg of the outer tubular member with its extension, and means closing the ends of said inner tubular element and said hot leg opposite the ends thereof connected by said elliptical sealing wall.

6. The structure of claim 5 in which said closing means includes a single wall extending transverse of the length of said hot leg and inner tubular element to close the ends thereof.

7. The structure of claim 5 in which said closing means supports the hot end extremity of said thermocouple.

References Cited in the file of this patent

UNITED STATES PATENTS

| | | |
|---|---|---|
| 1,849,832 | Herzag et al. | Mar. 15, 1932 |
| 2,012,465 | Godecke | Aug. 27, 1935 |
| 2,223,408 | Dietert | Dec. 3, 1940 |
| 2,581,229 | Battey | Jan. 1, 1952 |

FOREIGN PATENTS

| | | |
|---|---|---|
| 821,050 | France | Aug. 17, 1937 |